(12) United States Patent
Huang et al.

(10) Patent No.: US 8,233,195 B2
(45) Date of Patent: Jul. 31, 2012

(54) METHOD FOR REDUCING IMAGE NOISE

(75) Inventors: Yin-Chun Huang, Hsinchu (TW);
Chung-Wei Cheng, Hsinchu (TW)

(73) Assignee: Transpacific Systems, LLC, Wilmington, DE (US)

( * ) Notice: Subject to any disclaimer, the term of this patent is extended or adjusted under 35 U.S.C. 154(b) by 1150 days.

(21) Appl. No.: 10/695,327

(22) Filed: Oct. 27, 2003

(65) Prior Publication Data

US 2004/0085591 A1    May 6, 2004

(30) Foreign Application Priority Data

Oct. 25, 2002  (TW) .............................. 91125114 A

(51) Int. Cl.
*H04N 1/409*  (2006.01)
*H04N 1/581*  (2006.01)

(52) U.S. Cl. ...... 358/3.06; 358/3.26; 358/463; 358/470; 358/408; 358/534; 358/3.13; 358/3.27; 382/260; 382/261; 382/166

(58) Field of Classification Search ................. 358/3.26, 358/534, 3.13, 3.27, 3.06, 463, 470, 427, 358/408; 382/260, 261, 166
See application file for complete search history.

(56) References Cited

U.S. PATENT DOCUMENTS

| | | | |
|---|---|---|---|
| 4,955,065 A * | 9/1990 | Ulichney | 382/270 |
| 5,323,247 A * | 6/1994 | Parker et al. | 358/3.08 |
| 5,553,200 A * | 9/1996 | Accad | 358/1.9 |
| 5,748,770 A * | 5/1998 | Hajjahmad et al. | 382/167 |
| 5,764,374 A * | 6/1998 | Seroussi et al. | 382/244 |
| 6,269,193 B1 * | 7/2001 | Young et al. | 382/244 |
| 6,650,773 B1 * | 11/2003 | Maurer et al. | 382/166 |
| 6,819,804 B2 * | 11/2004 | Tenze et al. | 382/262 |
| 7,209,100 B1 * | 4/2007 | Suzuki | 345/63 |
| 7,212,315 B2 * | 5/2007 | Huang et al. | 358/3.13 |
| 7,233,414 B2 * | 6/2007 | Okada et al. | 358/3.01 |

* cited by examiner

*Primary Examiner* — James A Thompson
*Assistant Examiner* — Quang N Vo
(74) *Attorney, Agent, or Firm* — Stolowitz Ford Cowger LLP

(57) ABSTRACT

A method for reducing image noise is provided. The procedure of the method is provided in the following steps. First, the color level scale of a scanned image of a document is reduced by a plurality of bits in order to subtract a noise level from the scanned image. Then the color level scales of all pixels of the image are recombined by a halftone pattern method in order to recover the color level scales. Finally the missing codes of the image are filled out by bit enhance method. Because of the color level scales of the proceeding image are not reduced, the scanned image quality does not be blurred by the method. Because the method does not minimize the color level of the proceeding image, the image noise can be reduced without blurring the scanned image and the quality of the image can be increased after the process thereof. And because each color level of the pixel in the image is subtracted by a noise level, some of the bits are removed and the capacity of the image file is decreased.

25 Claims, 1 Drawing Sheet

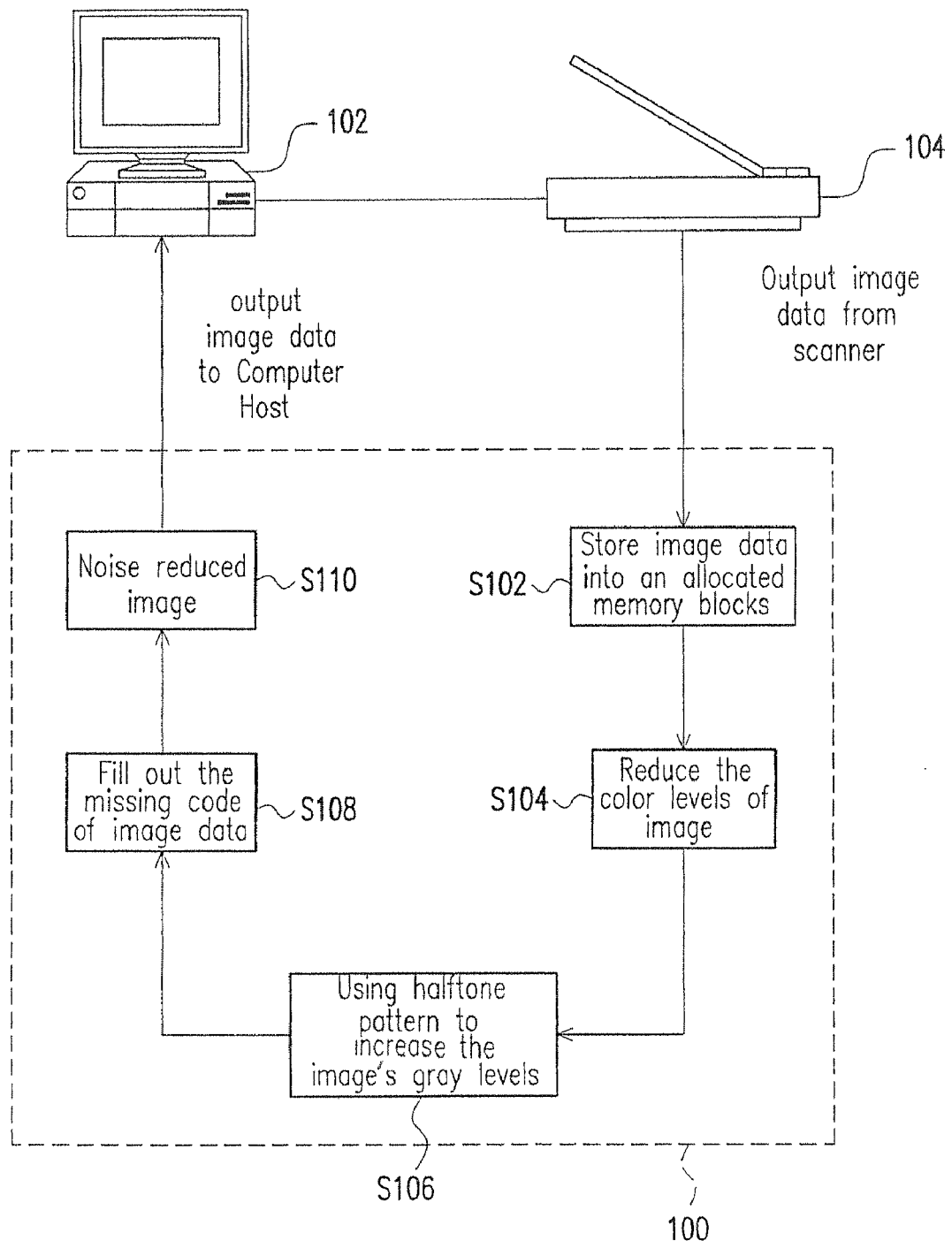

METHOD FOR REDUCING IMAGE NOISE

CROSS-REFERENCE TO RELATED APPLICATION

This application claims the priority benefit of Taiwan application serial no. 91125114, filed Oct. 25, 2002.

BACKGROUND OF THE INVENTION

1. Field of the Invention

The present invention relates to a method for reducing image noise. More particularly, the present invention relates to a method for reducing scanned image noise and reducing scanned image file capacity.

2. Description of the Related Art

A scanner is a machine having a function similar to a camera combined with a Xerox machine, as the scanner can copy an image to a file and then print it out on a printer. In the early days when the scanner was first produced, the price was expensive and only a few people or offices could afford one. Recently, because the manufacturing techniques of optical scan heads are mature and mass production of scanners is now available, the price of scanners has gone down and the scanner has become the next must-have peripheral for mainstream PC users. The scanner market is heating up rapidly.

The scanner can be classified into several types including the handy scanner, sheetfed scanner, business card scanner, film scanner, drum scanner and flatbed scanner, according to the prices and functions thereof. A flatbed scanner is an opto-electric device capable of converting the printed data on a document into digital form for processing by the computer. The document that is to be scanned is fixedly placed on a transparent glass plate on the flatbed scanner and a movable scan head moves over the document to make a scan that converts the printed data on the document into digital form. The scan head is optically coupled to a linear array of light-sensing cells such as a charge-coupled device ("CCD"), each cell corresponding to a pixel in the scanned image. Because a flatbed scanner has a simple structure and is easy to use, it has become mainstream among the varieties of scanners.

When a scanner is used for scanning a document, image noise of the scanned image of the document is produced due to the scanner devices. The image noise may reduce the image quality of the scanned image and make variations compared with the document. A conventional method for reducing image noise is to decrease the color level of the scanned image by a hardware filter, for example, an optical filter. Since the color level of each pixel of the scanned image is averaged in order to average and minimize the image noise, the scanned image quality may be blurred by this method. Another conventional method for reducing image noise is to decrease the color level of the scanned image by a software filter, for example, to set a color scale level as the noise level of a scanned image. But after the color level of every pixel of the scanned image is subtracted by the noise level in order to minimize the image noise, the scanned image quality may also be reduced.

SUMMARY OF THE INVENTION

Accordingly, one object of the present invention is to provide a method for reducing image noise that does not blur the scanned image after the processing thereof.

It is another object of the invention to provide a method for reducing image noise that can increase the quality of the scanned image after the processing thereof.

It is another object of the invention to provide a method for reducing image noise that can reduce the capacity of the scanned image files after the processing thereof.

To achieve these and other advantages and in accordance with the purpose of the invention, as embodied and broadly described herein, the method is provided in the following steps. First, the color level scale of a scanned image of a document are reduced by a plurality of bits in order to subtract a noise level from the scanned image. Then the color level scale of all pixels of the image are recombined by a halftone pattern method in order to recover the color level scale. Finally the missing codes of the image are filled out by a bit enhance method. Because the color level scale of the proceeding image are not reduced, the scanned image quality is not blurred by the method.

In a preferred embodiment of the invention, a scanned image, composed of a plurality of pixels having a scale of bits, is proceeded by the steps of reducing a plurality of bits of the scale of each pixel in the image, and recombining the scale of each pixel in the image.

A further embodiment of the invention, after the step of recombining the scale of each pixel in the image, further comprises a step of filling out missing codes of the pixels of the image.

In a still further embodiment of the invention, the step of reducing a plurality of bits of the scale of each pixel in the image can reduce the scale of each pixel in the image.

In a still further embodiment of the invention, the step of recombining the scale of each pixel in the image comprises a halftone pattern method.

In a still further embodiment of the invention, a pattern composed by the halftone pattern method is a matrix pattern, in which the row and column numbers of the matrix pattern are dependent on the number of bits reduced in the step of reducing a plurality of bits of the scale of each pixel in the image.

In a still further embodiment of the invention, the step of filling out missing codes of the pixels of the image comprises a bit enhance method.

In another preferred embodiment of the invention, a scanned image, composed of a plurality of pixels having a scale of bits, is proceeded by the steps of reducing a plurality of bits of the scale of each pixel in the image, recombining the scale of each pixel in the image and filling out missing codes of the pixels of the image.

In a still further embodiment of the invention, the step of reducing a plurality of bits of the scale of each pixel in the image can reduce the scale of each pixel in the image.

In a still further embodiment of the invention, the step of recombining the scale of each pixel in the image comprises a halftone pattern method.

In a still further embodiment of the invention, a pattern composed by the halftone pattern method is a matrix pattern, in which the row and column numbers of the matrix pattern are dependent on the number of bits reduced in the step of reducing a plurality of bits of the scale of each pixel in the image.

In a still further embodiment of the invention, the step of filling out missing codes of the pixels of the image comprises a bit enhance method.

Accordingly, because the method does not minimize the color level of the proceeding image, the image noise can be reduced without blurring the scanned image and the quality of the image can be increased after the process thereof. And because the color level of the pixels in the image is subtracted by a noise level, some of the bits of the pixels are removed and the capacity of the image file is decreased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 illustrates a procedure of the method for reducing image noise of a preferred embodiment of the present invention.

DESCRIPTION OF THE PREFERRED EMBODIMENTS

The present invention provides a method for reducing image noise. FIG. 1 illustrates a procedure of the method for reducing image noise of a preferred embodiment of the present invention. Referring to FIG. 1, a scanner 104 is connected to a computer 102 and an image is scanned by the scanner 104. The scanned image is output from the scanner 104 and is processed by steps S102 to S110 in a procedure 100 to reduce the noise of the scanned image.

Preferably, a scanned image output from the scanner 104 is stored into allocated memory blocks in step 102. The color of every pixel in the scanned image is composed of a red color element, green color element and blue color element. In order to compose a full-color pixel by the three color elements above, each color element has a 256 scale for a pixel, i.e., each color element is composed by a byte. For example, a pixel may have a red color element of a 210 scale, a green color element of 200 scales and a blue color element of a 190 scale.

Then the color level scale of the scanned image is reduced in step 104. The color level scale of every color element in all pixels of the scanned image are reduced. For example, if a red color level scale of a pixel is 43 (i.e., 00101011 in binary), the color level scale is then reduced to 40 (i.e., 00101000). The purpose of the step 104 is to set a noise level and to subtract the image from the noise level. Since the setting of the noise level compared with the full-color level is small (i.e., the ratio is about 0~3 to 256), the step 104 does not reduce the color level resolution of the scanned image.

Thereafter, the color level scale of every pixel of the scanned image processed above is increased by using a halftone pattern method in step 106. The purpose of the step 106 is to compose a color level scale by a pattern with less color level scale. A color level pattern of a pixel in halftone pattern method is composed by a matrix, for example but not limited to, a n×m matrix, in which n and m are positive integers and n is the same or different from m. The number n and m are dependent on the reduced number of bits in step 104, i.e., dependent on the noise level (for example, if the reduced number of bits are 2, the pattern may be a 2×2 matrix). The halftone pattern method can recombine the color level scale of the scanned image processed by step 104 to a color level the same as the scanned image stored in step 102. For example, if the color level of the scanned image is 8 bits, after step 104, the color level of the image is 6 bits, and after step 106, the color level of the image is recombined to 8 bits.

After that, the missing codes of the image processed above are filled out in step 108. The method of filling out the missing code includes, but is not limited to, a bit enhance method.

Finally, a noise reduced image is output to the computer 102 and is screened on a monitor of the computer 102 in step 110.

Accordingly, because the method does not minimize the color level of the noise reduced image, the image noise can be reduced without blurring the scanned image and the quality of the image can be increased after the process thereof. And because every color level scale of the pixel in the image is subtracted by a noise level, some of the bits are removed and the capacity of the image file is decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method, comprising:
    scanning an image with a scanner to obtain a full color level of a color element of a pixel of the scanned image;
    decreasing the full color level of the color element by reducing a number of bits of the full color level of the color element to form a reduced color level image, wherein the number of bits reduced from the full color level is dependent on an image noise associated with the scanned image, and wherein decreasing the full color level causes the image noise to be substantially removed from the scanned image;
    composing a pattern comprising the number of bits reduced from the full color level of the color element, wherein the pattern has less color level of the color element than the full color level; and
    restoring the full color level of the color element of the pixel by combining the reduced color level image with the pattern, wherein the full color level of the color element is restored without reintroducing the image noise into the scanned image.

2. The method of claim 1, wherein the reduced color level image and the pattern are combined using a bit-enhanced method.

3. The method of claim 1, wherein combining the reduced color level image with the pattern restores the pixel to include a same number of bits of the color element as before the full color level was decreased.

4. The method of claim 1, wherein the pattern comprises a halftone pattern.

5. A method, comprising:
    scanning an image with a scanner to obtain a gray scale of one or more pixels of the image;
    reducing the gray scale of the one or more pixels of the scanned image by reducing a number of bits of gray scale image data from each of the one or more pixels, wherein the number of bits of gray scale image data reduced from the one or more pixels is determined based, at least in part, on an image noise associated with the scanned image, and wherein reducing the gray scale causes the image noise to be substantially removed from the scanned image; and
    restoring the gray scale of the one or more pixels using a halftone pattern comprising a matrix, wherein a number of rows and a number of columns of the matrix correspond to the number of bits of gray scale image data reduced from the one or more pixels, and wherein the gray scale is restored without reintroducing the image noise into the scanned image.

6. The method of claim 1, wherein the color level of the pattern depends on the number of bits reduced from the full color level.

7. A method, comprising:
scanning an image with a scanner to obtain a full image level of a color element of a pixel of the image;
reducing the full image level of the color element by decreasing a number of bits of the color element according to an image noise associated with the scanned image, wherein reducing the full image level causes the image noise to be substantially removed from the scanned image;
composing a halftone pattern comprising a reduced image level of the color element corresponding to the decreased number of bits; and
restoring the full image level of the color element of the pixel using the halftone pattern without reintroducing the image noise into the scanned image.

8. The method of claim 7, wherein the full image level of the color element in the restored image level comprises a same number of bits of the color element obtained by scanning the image.

9. The method of claim 7, wherein the halftone pattern comprises a matrix having a number of rows equal to the decreased number of bits.

10. The method of claim 9, wherein the matrix further comprises a number of columns equal to the decreased number of bits.

11. The method of claim 7, further comprising displaying the scanned image including the restored image level on a computer monitor.

12. The method of claim 7, further comprising filling out missing codes of the pixel using a bit-enhanced method.

13. An apparatus, comprising:
means for scanning an image to obtain a full image level of a color element of one or more pixels of the image; and
means for operating on the scanned image, wherein said operating comprises:
reducing the full image level by decreasing a number of bits of the color element from the one or more pixels, wherein the number of bits corresponds approximately to an image noise associated with the scanned image, and wherein reducing the full image level causes the image noise to be substantially removed from the scanned image;
composing a halftone pattern comprising a reduced image level of the color element, wherein the reduced image level corresponds to the decreased number of bits; and
recombining an image level of the one or more pixels in the image using the halftone pattern without reintroducing the image noise into the scanned image.

14. The apparatus of claim 13, wherein the color element in the recombined image level comprises a same number of bits of the color element as in the full image level.

15. The apparatus of claim 13, wherein the halftone pattern comprises a matrix having a number of rows and columns equal to the decreased number of bits.

16. The apparatus of claim 13, wherein the image level is recombined with the halftone pattern to restore the color element of the one or more pixels to the full image level.

17. The apparatus of claim 13, wherein the number of bits decreased from the full image level approximates a level of the image noise.

18. The apparatus of claim 13, wherein the reduced image level of the pattern corresponds with the number of bits reduced from the full image level.

19. The apparatus of claim 13, wherein one or more of the full image level, the reduced image level, and the image level comprise a color level.

20. The apparatus of claim 13, wherein one or more of the full image level, the reduced image level, and the image level comprise a gray level.

21. The method of claim 1, wherein the scanned image comprises three color elements, and wherein the pixel comprises at least one of the three color elements.

22. The method of claim 21, wherein the three color elements comprise a red color element, a blue color element, and a green color element.

23. The method of claim 8, wherein the full image level of the color element and the restored image level of the color element comprises a gray level.

24. The method of claim 23, wherein the full image level is reduced by decreasing a number of bits of the gray level.

25. The method of claim 7, wherein the number of bits of the color element decreased from the full image level is dependent on a level of the image noise.

* * * * *